Dec. 8, 1925.

S. N. PARKER 1,564,891

DEMOUNTABLE TIRE

Original Filed Nov. 2, 1923

S. N. Parker

Inventor,

By C. A. Snow & Co.

Attorneys.

Patented Dec. 8, 1925.

1,564,891

UNITED STATES PATENT OFFICE.

SAMUEL N. PARKER, OF NEW ORLEANS, LOUISIANA, ASSIGNOR OF ONE-HALF TO ARTHUR O'SHAUGHNESSY, OF NEW ORLEANS, LOUISIANA.

DEMOUNTABLE TIRE.

Application filed November 2, 1923, Serial No. 672,419. Renewed September 24, 1925.

*To all whom it may concern:*

Be it known that I, SAMUEL N. PARKER, a citizen of the United States, residing at New Orleans, in the parish of Orleans and State of Louisiana, have invented a new and useful Demountable Tire, of which the following is a specification.

The device forming the subject matter of this application is a demountable tire, adapted to be placed readily on the wheel of an automobile or other vehicle, to serve as a spare, thereby rendering it unnecessary for the owner of the vehicle to carry a pneumatic spare tire, it being a matter of common knowledge that a spare tire deteriorates rapidly when not in use.

It is within the province of the disclosure to improve generally and to enhance the utility of devices of that type to which the invention appertains.

With the above and other objects in view, which will appear as the description proceeds, the invention resides in the combination and arrangement of parts and in the details of construction hereinafter described and claimed, it being understood that, within the scope of what is claimed, changes in the precise embodiment of the invention shown, can be made, without departing from the spirit of the invention.

In the accompanying drawings:—

Figure 1:
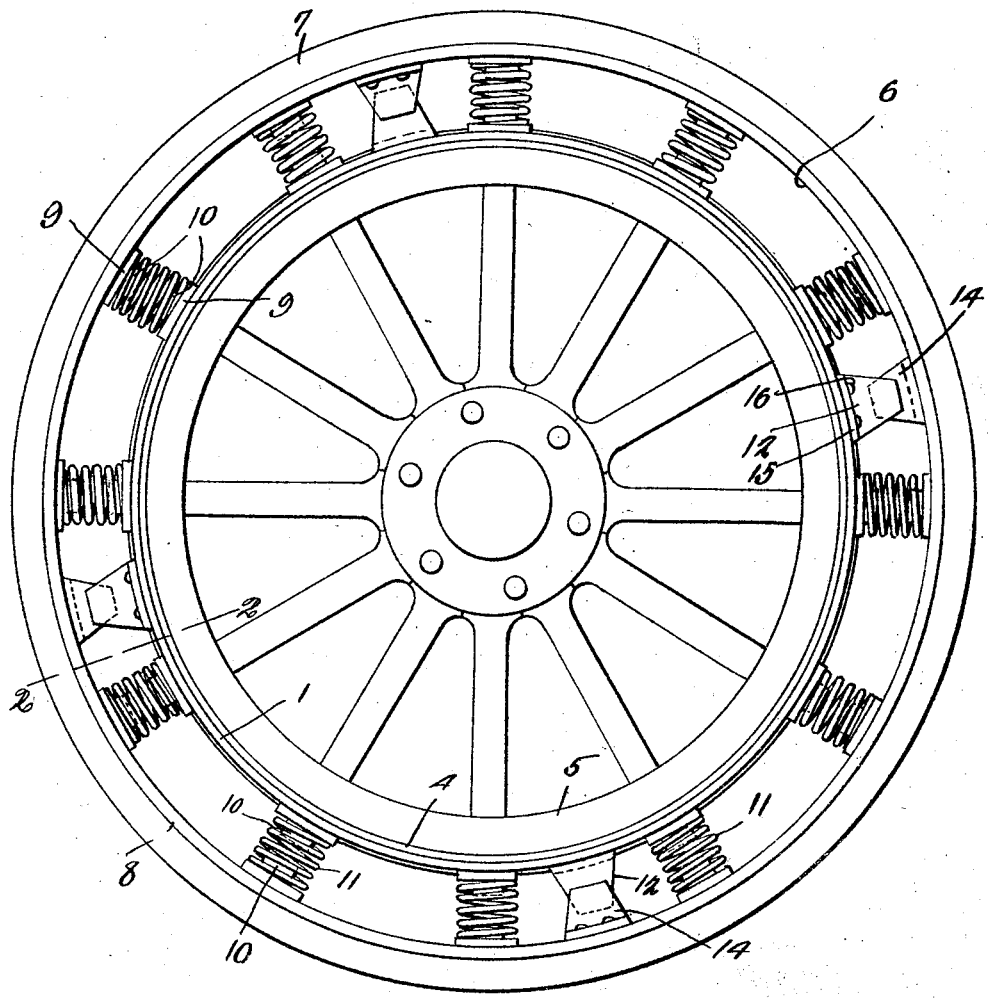
Figure 2:
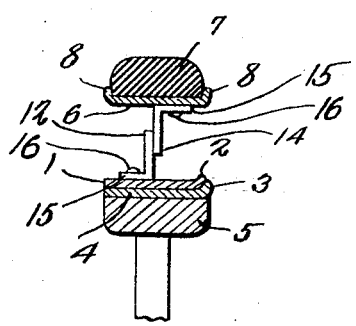

Figure 1 shows in elevation, a device constructed in accordance with the invention, mounted on an automobile wheel; Figure 2 is a section on the line 2—2 of Figure 1.

The device forming the subject matter of this application includes an inner rim 1, provided along one edge with a slight outstanding flange 2 adapted to cooperate with a flange 3 on the felly band 4 of a wheel 5, it being understood, that, the device forming the subject matter of this application is adapted to be mounted on any sort of an automobile wheel. No fastening means is shown, because I am aware of the fact that a fastening means cannot be claimed in the same application with a demountable tire.

The device comprises an outer rim 6 carrying a tire 7, which may be made of solid rubber or any other suitable material, the rim 6 having flanges 8 which hold the tire 7 in place. The inner rim 1 and the outer rim 6 have circumferentially spaced base plates 9 carrying radial studs 10 on which are mounted the ends of compression springs 11 abutting against the base plates. The inner rim 1 has outwardly extended radial projections 12 in the form of plates, overlapped on similar inwardly extended projections 14 on the rim 6, the projections 12 and 14 being secured respectively, to the inner rim 1 and to the outer rim 6 by oppositely projecting angularly disposed feet 15, connected by attaching elements 16 with the parts 1 and 6. Alternate ones of the projections 12 of the inner rim 1 engage one surface of the projections 14 on the rim 6, and the remaining projections 12 on the rim 1 engage the opposite surfaces of the projections 14 on the rim 6, the rim 1 being held against lateral movement with respect to the rim 6.

The device forming the subject matter of this application will provide the necessary resiliency, without side play, and may be carried for a long period of time, as a spare, without deteriorating to any extent.

What I claim is:

In a device of the class described, an inner rim, an outer rim, springs interposed between the rims, angle members of like construction, comprising transverse flanges secured to the rims and outstanding flanges constituting projections on the rims, some of the projections on the inner rim overlapping one side of the corresponding projections on the outer rim, and others of the projections on the inner rim overlapping the corresponding projections of the outer rim on the opposite side thereof, to hold the outer rim for movement in a plane parallel to the inner rim, but against lateral movement with respect to the inner rim.

In testimony that I claim the foregoing as my own, I have hereto affixed my signature.

SAMUEL N. PARKER.